(12) United States Patent
Fenoglio et al.

(10) Patent No.: US 11,595,268 B2
(45) Date of Patent: Feb. 28, 2023

(54) DEEP FUSION REASONING ENGINE (DFRE) FOR PRIORITIZING NETWORK MONITORING ALERTS

(71) Applicant: Cisco Technology, Inc., San Jose, CA (US)

(72) Inventors: Enzo Fenoglio, Issy-les-Moulineaux (FR); Hugo Latapie, Long Beach, CA (US); David Delano Ward, Somerset, WI (US); Sawsen Rezig, Nanterre (FR); Raphaël Wouters, Lincent (BE); Didier Colens, Bierges (BE); Donald Mark Allen, Colorado Springs, CO (US); Dmitri Goloubev, Waterloo (BE)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 17/186,148

(22) Filed: Feb. 26, 2021

(65) Prior Publication Data

US 2021/0184915 A1 Jun. 17, 2021

Related U.S. Application Data

(63) Continuation of application No. 16/429,177, filed on Jun. 3, 2019, now Pat. No. 10,965,516, which is a
(Continued)

(51) Int. Cl.
*H04L 41/16* (2022.01)
*H04L 41/0604* (2022.01)
(Continued)

(52) U.S. Cl.
CPC ............... *H04L 41/16* (2013.01); *G06N 5/04* (2013.01); *G06N 20/00* (2019.01); *H04L 41/069* (2013.01);
(Continued)

(58) Field of Classification Search
CPC ... H04L 41/16; H04L 41/0609; H04L 41/069; H04L 41/142; H04L 41/22; H04L 43/04; G06N 5/04; G06N 20/00
See application file for complete search history.

(56) References Cited

U.S. PATENT DOCUMENTS

| 7,379,993 B2 | 5/2008 | Valdes et al. |
| 7,504,936 B2 | 3/2009 | Miller et al. |

(Continued)

OTHER PUBLICATIONS

Agrawal, et al., "VQA: Visual Question Answering", Proceedings of the IEEE International Conference on Computer Vision (ICCV), 2015, 25 pages, arXiv:1505.00468v7 [cs.CL].
(Continued)

*Primary Examiner* — Min Jung
(74) *Attorney, Agent, or Firm* — Behmke Innovation Group LLC; James M. Behmke; Jonathon P. Western

(57) ABSTRACT

In one embodiment, a service that monitors a network detects a plurality of anomalies in the network. The service uses data regarding the detected anomalies as input to one or more machine learning models. The service maps, using a conceptual space, outputs of the one or more machine learning models to symbols. The service applies a symbolic reasoning engine to the symbols, to rank the anomalies. The service sends an alert for a particular one of the detected anomalies to a user interface, based on its corresponding rank.

20 Claims, 11 Drawing Sheets

Related U.S. Application Data continuation-in-part of application No. 16/365,096, filed on Mar. 26, 2019, now Pat. No. 10,887,197.

(60) Provisional application No. 62/683,214, filed on Jun. 11, 2018, provisional application No. 62/648,489, filed on Mar. 27, 2018.

(51) Int. Cl.

| | |
|---|---|
| *G06N 20/00* | (2019.01) |
| *G06N 5/04* | (2023.01) |
| *H04L 41/069* | (2022.01) |
| *H04L 43/04* | (2022.01) |
| *H04L 41/22* | (2022.01) |
| *H04L 41/142* | (2022.01) |

(52) U.S. Cl.
CPC ........ *H04L 41/0609* (2013.01); *H04L 41/142* (2013.01); *H04L 41/22* (2013.01); *H04L 43/04* (2013.01)

(56) References Cited

U.S. PATENT DOCUMENTS

| | | |
|---|---|---|
| 8,205,259 B2 | 6/2012 | Stute |
| 10,887,197 B2 | 1/2021 | Fenoglio et al. |
| 10,965,516 B2 | 3/2021 | Fenoglio et al. |
| 2017/0032130 A1 | 2/2017 | Joseph Durairaj |
| 2017/0330096 A1 | 11/2017 | Das Gupta et al. |
| 2019/0289025 A1 | 9/2019 | Kursun |
| 2019/0325060 A1* | 10/2019 | Fenoglio ............... G06F 16/906 |
| 2019/0342195 A1 | 11/2019 | Mermoud |
| 2020/0166921 A1 | 5/2020 | Lavid Ben Lulu |
| 2020/0201727 A1* | 6/2020 | Nie ........................ G06N 20/00 |
| 2021/0042532 A1 | 2/2021 | Latapie et al. |
| 2021/0152440 A1* | 5/2021 | Fenoglio ............. H04L 41/5009 |
| 2021/0174155 A1 | 6/2021 | Smith et al. |
| 2021/0279602 A1* | 9/2021 | Latapie .................. G06N 5/025 |
| 2021/0279615 A1 | 9/2021 | Latapie et al. |
| 2021/0390423 A1 | 12/2021 | Latapie et al. |

OTHER PUBLICATIONS

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bĕlohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

Gärdenfors, Peter, "Conceptual Spaces: The Geometry of Thought", 2000, 398 pages, MIT Press.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Kiryati, et al., "A probabilistic Hough transform", Pattern Recognition. 24(4), 1991, pp. 303-316, The Pattern Recognition Society.

Korzybski, Alfred, "Manhood Of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.

(56) References Cited

OTHER PUBLICATIONS

Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Searle, John R., "The Rediscovery of the Mind", 1992, 104 pages, MIT Press.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Taylor, J. G., "William James on Consciousness Beyond the Margin", 1996, 231 pages, Princeton University Press.
Thórisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thórisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, Pei, "Rigid Flexibility—The Logic of Intelligence", Draft for Comment, Feb. 8, 2004, 329 pages, mindspring.com.
Wang, et al. "Self in NARS, an AGI System", vol. 5, Article 20, Mar. 2018, 15 pages, Frontiers in Robotics and AI.
Wang, et al., "SuperGlue: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Heirarchies of Concepts", I. Rival (Ed.), Ordered Sets, 1982, pp. 314-339.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.
Siraj, et al., "Multi-Level Alert Clustering for Intrusion Detection Sensor Data", NAFIPS 2005—2005 Annual Meeting of the North American Fuzzy Information Processing Society, Jun. 26-28, 2005, pp. 748-753, IEEE.
Srivastava, Tavish, "An Alternative to Deep Learning? Guide to Hierarchical Temporal Memory (HTM) for Unsupervised Learning", online: https://www.analyticsvidhya.com/blog/2018/05/alternative-deep-learning-hierarchical-temporal-memory-htm-unsupervised-learning/. May 14, 2018, 21 pages, Analytics Vidhya.

* cited by examiner

DEEP FUSION REASONING ENGINE (DFRE) FOR PRIORITIZING NETWORK MONITORING ALERTS

RELATED APPLICATIONS

This application is a continuation of, and claims priority to, U.S. patent application Ser. No. 16/429,177, filed on Jun. 3, 2019, entitled DEEP FUSION REASONING ENGINE (DFRE) FOR PRIORITIZING NETWORK MONITORING ALERTS, which is a continuation-in-part of, and claims priority to, U.S. patent application Ser. No. 16/365,096, filed on Mar. 26, 2019, entitled DEEP FUSION REASONING ENGINE (DFRE) FOR DYNAMIC AND EXPLAINABLE WIRELESS NETWORK QoE METRICS, which claims priority to U.S. Provisional Patent App. No. 62/648,489, filed on Mar. 27, 2018, entitled GOAL-ORIENTED SEMANTIC COLLABORATION AGENTS, by Latapie, et al., and to U.S. Provisional Patent App. No. 62/683,214, filed on Jun. 11, 2018, entitled DEEP FUSION REASONING ENGINE (DFRE), by Latapie et al., the contents of which are incorporated herein by reference.

TECHNICAL FIELD

The present disclosure relates generally to computer networks, and, more particularly, to a deep fusion reasoning engine (DFRE) for prioritizing network monitoring alerts.

BACKGROUND

Networks are large-scale distributed systems governed by complex dynamics and very large number of parameters, which inhibit the application of a fixed set of patterns that aid in network operation and management. In general, network monitoring involves applying analytics to captured network information, to assess the health of the network. For example, a network monitoring service may track and assess metrics such as available bandwidth, packet loss, jitter, and the like, to ensure that the experiences of users of the network are not impinged. However, as networks continue to evolve so too will the number of applications and network services present in a given network, as well as the number of metrics available to monitor the network.

Automated systems for monitoring network operations tend to produce a massive number of alerts, many of which are of little value to a network administrator who is responsible for maintaining its health. It has been shown that many network administrators today either ignore important alerts, due to the large volume of alerts presented, or even disable certain alerting functions that could indicate actual problems in the network. Worse, the number of alerts is expected to grow over time, as networks increase in complexity and their corresponding monitoring systems become more capable.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
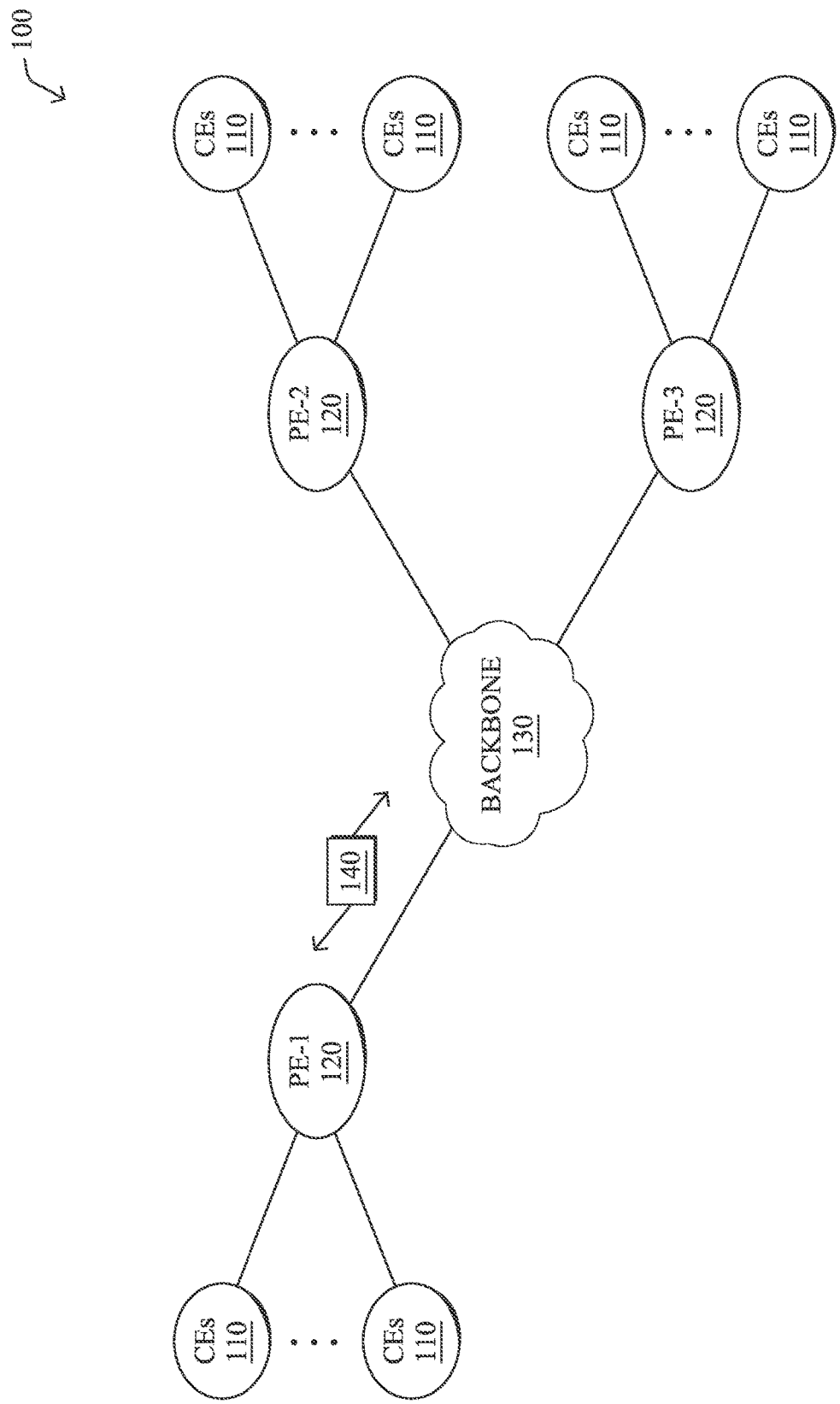
FIGS. 1A-1B illustrate an example communication network.

According to one or more embodiments of the disclosure, a service that monitors a network detects a plurality of anomalies in the network. The service uses data regarding the detected anomalies as input to one or more machine learning models. The service maps, using a conceptual space, outputs of the one or more machine learning models to symbols. The service applies a symbolic reasoning engine to the symbols, to rank the anomalies. The service sends an alert for a particular one of the detected anomalies to a user interface, based on its corresponding rank.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
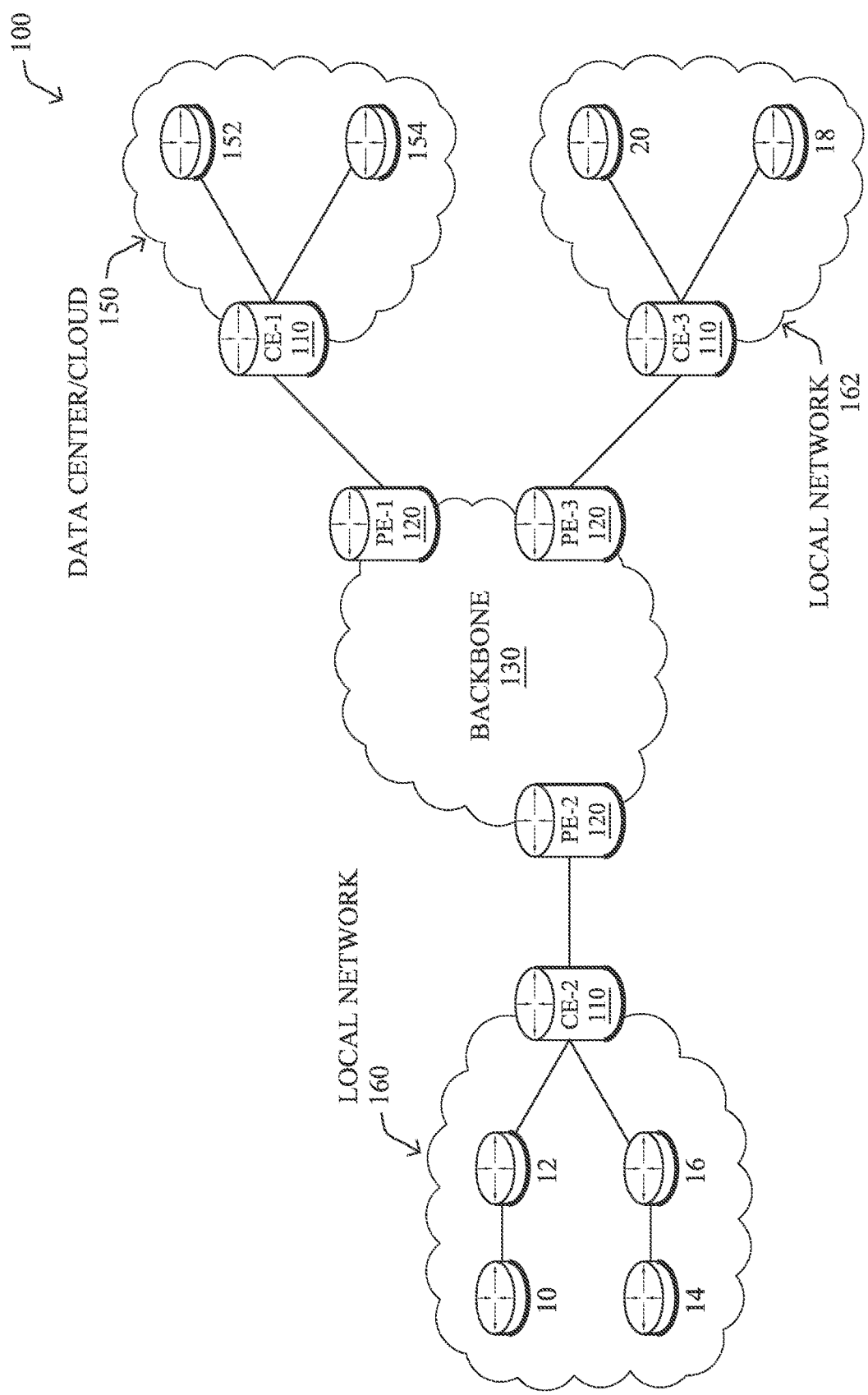

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
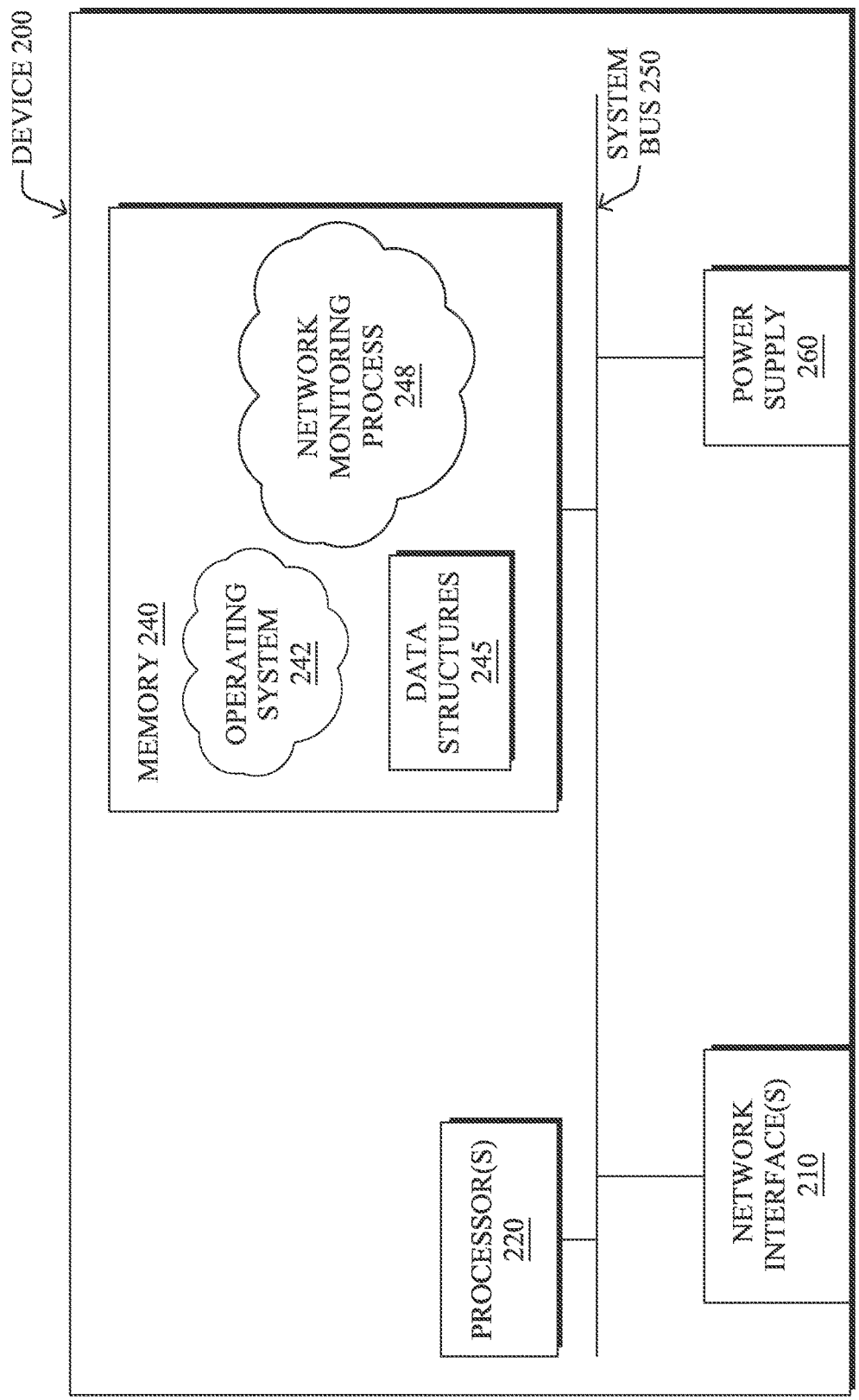
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network monitoring process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network monitoring process 248 includes computer executable instructions that, when executed by processor(s) 220, cause device 200 to perform network monitoring functions in the network, such as detecting anomalies in the network, predicting and/or detecting problems in the network, initiating corrective measures, and/or alerting network administrators and other interested parties as to the health and status of the network.

In various embodiments, network monitoring process 248 may utilize machine learning techniques, in whole or in part, to perform its functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, network monitoring process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network monitoring process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, network monitoring process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
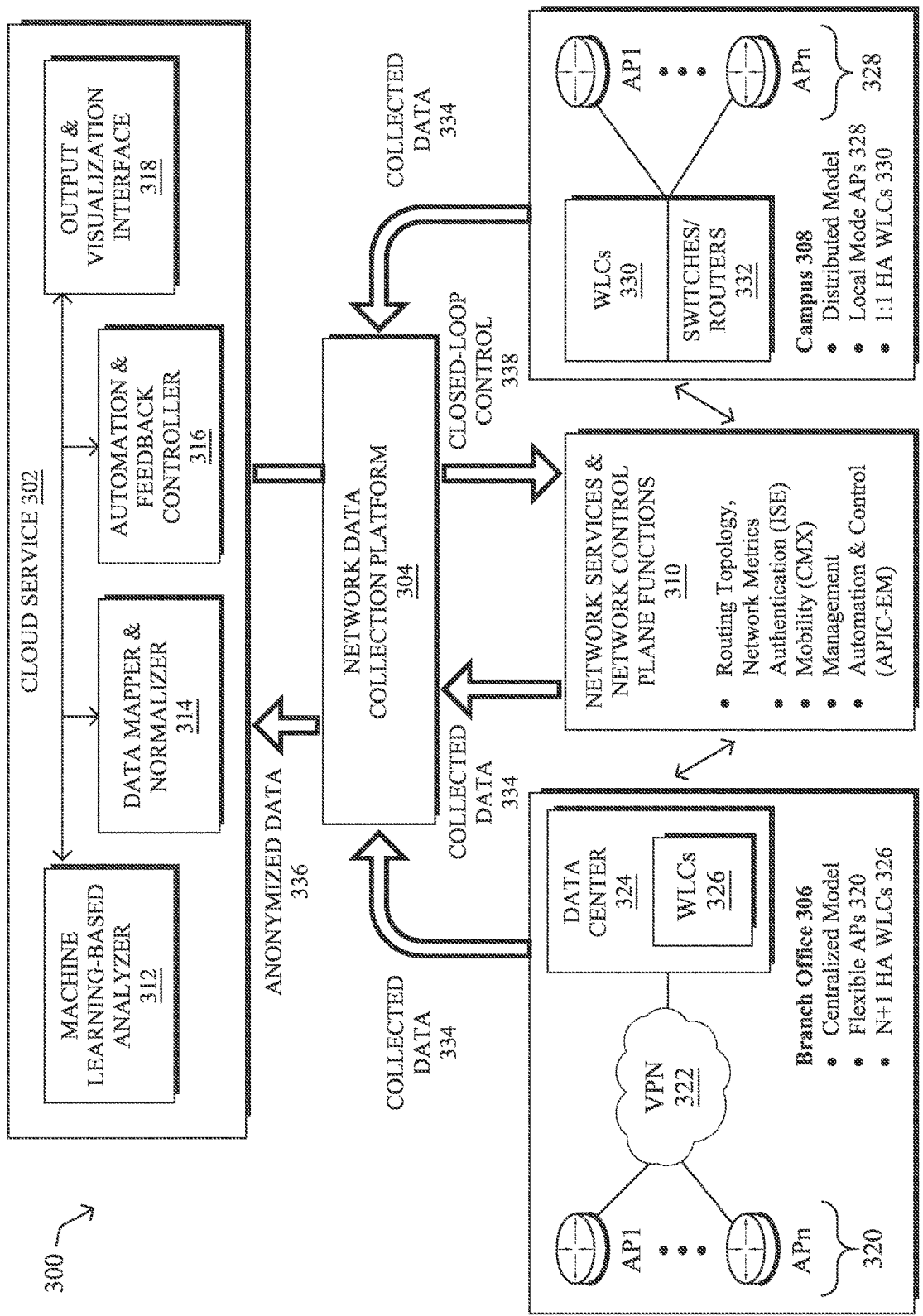
FIG. 3 illustrates an example network monitoring system.

FIG. 3 illustrates an example network monitoring system 300, according to various embodiments. As shown, at the core of network monitoring system 300 may be a cloud-based network monitoring service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through n$^{th}$ access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors of the devices, thereby allowing cloud service 302 to identify and remediate potential network issues before alerting the network administrators or other users interested in the status of the network.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict the network status, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 302 will be able to identify the major root cause of this predicted condition, thus allowing cloud service 302 to remediate the situation before it occurs. The predictive analytics model(s) of analyzer 312 may also be able to predict other issues such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or control system in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS would be achieved if the device switches to a different AP 320 or 328.

Trending Analytics Model(s): The trending analytics model(s) may include multivariate models that can predict future states of the network, thus separating noise from actual network trends and cope with multi-time scale changes. Such predictions can be used, for example, for purposes of capacity planning and other "what-if" scenarios.

Machine learning-based analyzer 312 may be specifically tailored for use cases in which machine learning is the only viable approach due to the high dimensionality of the dataset where patterns cannot otherwise be understood and learned. For example, finding a pattern to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network monitoring system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, automated systems for monitoring network operations tend to produce a massive amount of anomaly detection alerts. This leads to a significant amount of wasted time and investment on the part of network administrators and other users interested in the status of the network. Even worse, true alerts are often ignored and, in extreme cases, switched off or de-commissioned. This prevents the adoption of automated network monitoring systems by many entities.

What is needed is a network monitoring system that has the ability to: (1) systematically identify which alerts should actually be reported (i.e., separate the signal-to-noise during alerts generation), and (2) optimize the available resource capacity that users of the system have to react to alerts by automating its relevancy, potential impact, and/or targets of detected issues. These capabilities can be used to target data to specific users or groups that could be impacted by a network anomaly. For example, problems occurring at the device or component level can be manifested as issues in packet flow, interfaces, call drops, or in any other way. To this end, it is important to keep in mind that much of the complexity of the network environment is due to the dependencies across the different network layers and the capabilities required to deliver a network-based service.

Existing systems that rely on defined dependencies or ad-hoc models for purposes of alert generation require a significant amount of upfront configuration, as well as ongoing maintenance to continually update the alert mechanism. Typical examples of situations where alert prioritization is needed are as follows:

Alerts that span a collection of devices and a range of severity—for example, these alerts could relate to anything spanning from best practices not followed to an imminent reload due to a device running out of memory, security vulnerabilities, etc. Network administrators may dismiss all alerts as irrelevant due to underlying devices not being important (e.g., alerts for non-core devices).

Subjective interests of the alert reviews—for example, some alert reviewers may only be interested in issues that are causing or will cause disruption to important service/components (e.g., IGP).

A focus of efforts on unique new alerts—for example, there may be additional interest for new alerts, as existing systems have already been provisioned to address common/known issues or ignore spurious alerts.

Certain temporary degradation alerts are uninteresting—for example, maintenance and other immediate actions may cause a flurry of alerts that could otherwise be ignored by an alert reviewer.

Different groups of alert reviewers—for example, Information Security and Infrastructure users may have different views on the importance of certain alerts.

Specific tasks that may be of particular interest—for example, an alert reviewer may only be interested in alerts impacting or related to a target intent (e.g., device software upgrade, etc.).

Deep Fusion Reasoning Engine (DFRE) for Prioritizing Network Monitoring Alerts

The techniques herein introduce a cognitive automation approach, to build a list of top issues/alerts in a network monitoring service given a semantic measure of the impact of very large number of issues generated per hour (alerts), which can be on the order of thousands of alerts raised per hour. A critical feature and expected performance measure of the techniques herein is to increase the semantic signal-to-noise ratio between true alerts and fake alerts. In some aspects, a deep fusion reasoning engine (DFRE) can leverage deep fusion multimodal sensory inputs to produce a sub-symbolic multi-modal data fusion model. In further aspects, this sub-symbolic model can be mapped to a conceptual space to incorporate metrics for the extraction of domain concepts combined with an initial ontology, which supports domain knowledge as the input to a semantic reasoning engine. These initial elements can operate in real or simulated environments, enabling a conceptual model of networking, as well as a sub-symbolic data fusion model, to learn how to rank the impact of the various reported network issues (alerts) from a network monitoring service.

Specifically, in various embodiments, a service that monitors a network detects a plurality of anomalies in the network. The service uses data regarding the detected anomalies as input to one or more machine learning models. The service maps, using a conceptual space, outputs of the one or more machine learning models to symbols. The service applies a symbolic reasoning engine to the symbols, to rank the anomalies. The service sends an alert for a particular one of the detected anomalies to a user interface, based on its corresponding rank.

Illustratively, the techniques described herein may be performed by hardware, software, and/or firmware, such as in accordance with the network monitoring process 248, which may include computer executable instructions executed by the processor 220 (or independent processor of interfaces 210), to perform functions relating to the techniques described herein.

Figure 4:
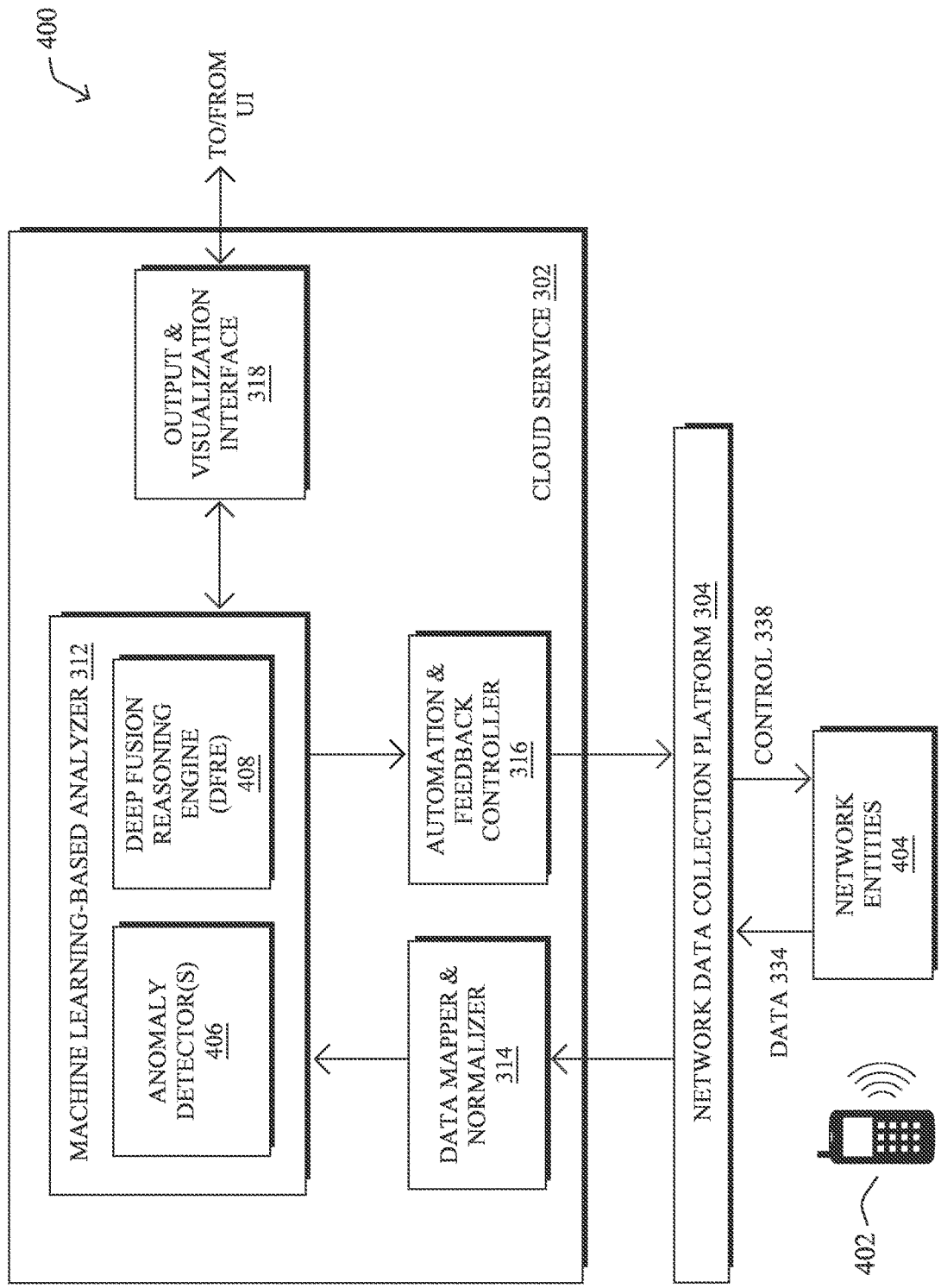
FIG. 4 illustrates an example architecture for monitoring a network.

FIG. 4 illustrates an example architecture 400 for monitoring a network, according to various embodiments. At the core of architecture 400 may be a deep fusion reasoning engine (DFRE) 408. In some implementations, DFRE 408 may be implemented within a network monitoring system, such as system 300 shown in FIG. 3. Accordingly, DFRE 408 may be implemented as part of cloud service 302 and, more specifically, as part of machine learning-based analyzer 312, as part of network data collection platform 304, and/or on one or more network elements/entities 404 that communicate with one or more client devices 402 within the monitored network itself. Further, DFRE 408 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 406. Each anomaly detector 406 may comprise an anomaly detection model, such as an unsupervised learning-based model. Optionally, anomaly detector(s) 406 may be complemented by a rule-based system and/or use heuristics, to detect network anomalies in the monitored network.

Example data that network data collection platform 304 may collect and provide to cloud service 302 for analysis may include, but is not limited to, any or all of the following:

Network topology information—e.g., the identities of network entities 404 and information regarding how they are interconnected.

Configuration information—e.g., how network entities 404 and/or client 406 are configured.

Device profile information—e.g., the make, model, software version, etc., of client 406 and/or network entities 404.

Device operational information—e.g., the queue states, CPU or other resource loads, number of connected clients, etc. of network entities 404.

Sensor/Telemetry data—e.g., any or all information regarding the traffic flows in the monitored network and/or the environmental conditions of the network. For example, this data may include YANG/NETCONF information, Netflow or IPFIX information, QoS or QoE information, location services information, wireless AP or WLC measurements such as Peak Signal to Noise Ratio (PSNR), Received Signal Strength Indicator (RSSI), or the like.

User Information—e.g., information regarding a user's department within the organization, etc.

When an anomaly detector 406 detects a network anomaly, output and visualization interface 318 may send an anomaly detection alert to a user interface (UI) for review by a subject matter expert (SME), network administrator, or other user. Notably, an anomaly detector 406 may assess any number of different network behaviors captured by the telemetry data from the monitored network (e.g., number of wireless onboarding failures, onboarding times, DHCP failures, etc.) according to some similarity distance measured in terms of likelihood of seeing a particular sequence in the telemetry data. The anomaly detector 406 may report the anomaly to the user interface via network anomaly as a ranked list of anomalies, output and visualization interface 318. However, as noted, a key challenge in network monitoring systems, and particularly those that rely on anomaly detection, is referred to as 'alert storms' in which the system raises a large number of alerts that can overwhelm the alert reviewer. In such a case, the alert reviewer may choose to either analyze the top ranked anomalies or use a cut-off threshold to select among anomalies.

In various embodiments, DFRE 408 may operate in conjunction with anomaly detector(s) 406 to prioritize the anomaly detection alerts generated by anomaly detector(s) 406 and send these alerts to output and visualization interface 318 based on their rankings. Said differently, DFRE 408 may be configured to suppress certain anomaly detection alerts from anomaly detector(s) 406 that are deemed to be of low value/interest to the alert reviewer.

Figure 5:
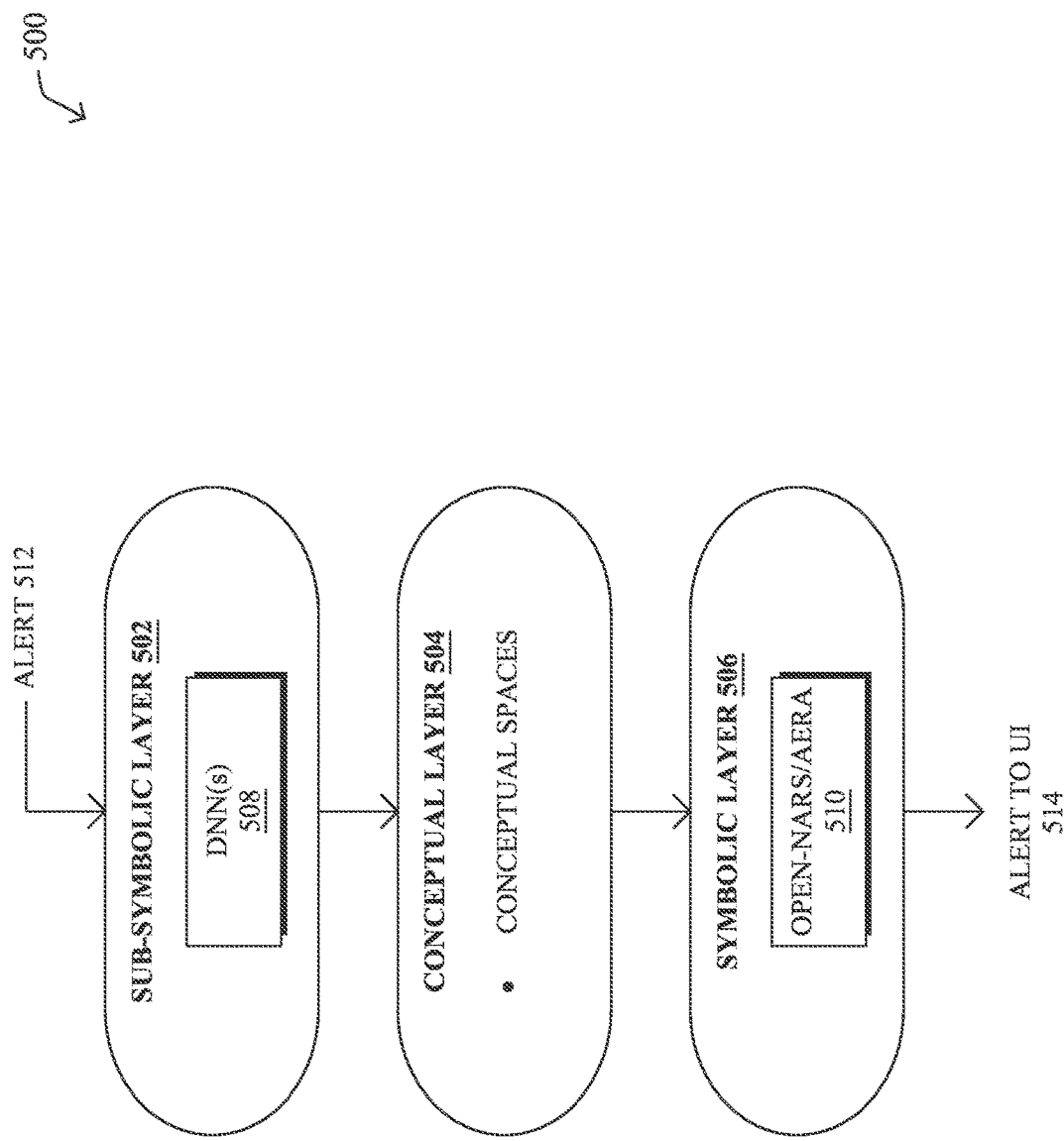
FIG. 5 illustrates an example layer hierarchy for prioritizing alerts by a network monitoring system for presentation to a user interface.

According to various embodiments, FIG. 5 illustrates an example layer hierarchy for prioritizing alerts by a network monitoring system for presentation to a user interface. For example, DFRE 402 described with respect to FIG. 4 may implement layer hierarchy 500, to assess an anomaly detection alert 512 generated by the network monitoring system and assess whether a corresponding alert 514 should be sent to a user interface (UI) for review.

At the lowest layer of hierarchy 500 is sub-symbolic layer 502 that processes the multimodal network data 512 collected from the network under scrutiny. For example, at the core of sub-symbolic layer 502 may be one or more DNNs 508 or other machine learning-based model that processes the multimodal network data 512 collected from the network, service providers, network operators, and/or network subscribers. In other words, sub-symbolic layer 502 may perform sensor fusion on network data 512 to identify hidden relationships between the data that would otherwise be undetectable.

At the opposing end of hierarchy 500 may be symbolic layer 506 that may leverage symbolic learning to perform the alert prioritization functions described herein. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 502, the symbolic learning and generalized intelligence performed at symbolic layer 506 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 502 and symbolic layer 506 may be conceptual layer 504 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v = <d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationism (connectivism) representations. Rather, the three kinds can be seen as three levels of representations of cognition with different scales of resolution. Namely, a conceptual space is built up from geometrical representations based on a number of quality dimensions that complements the symbolic and deep learning models of symbolic layer 506 and sub-symbolic layer 502, representing an operational bridge between them. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 506, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

Figure 6A:
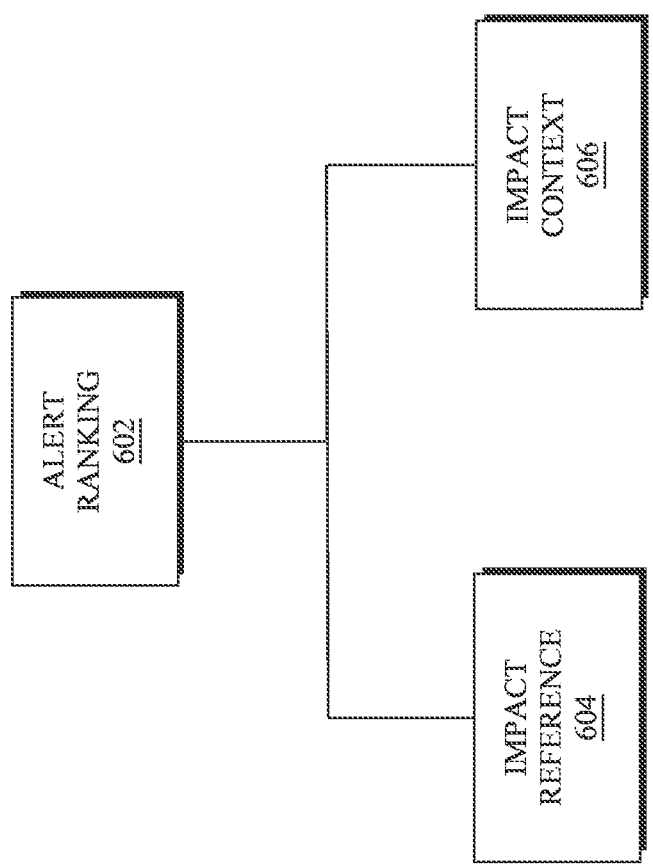
FIGS. 6A-6C illustrate example concept space information for prioritizing network monitoring alerts.
Figure 6B:
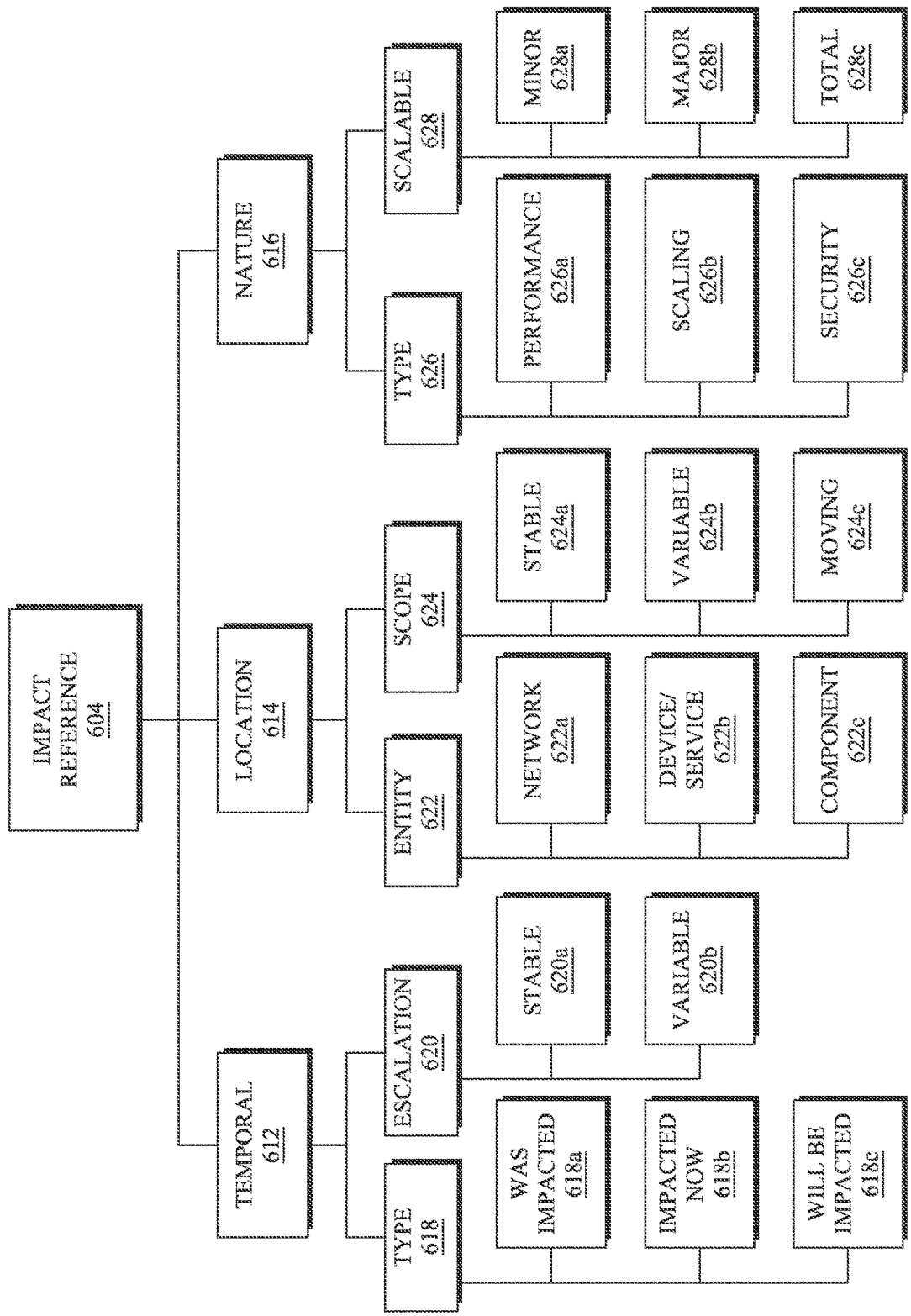
Figure 6C:
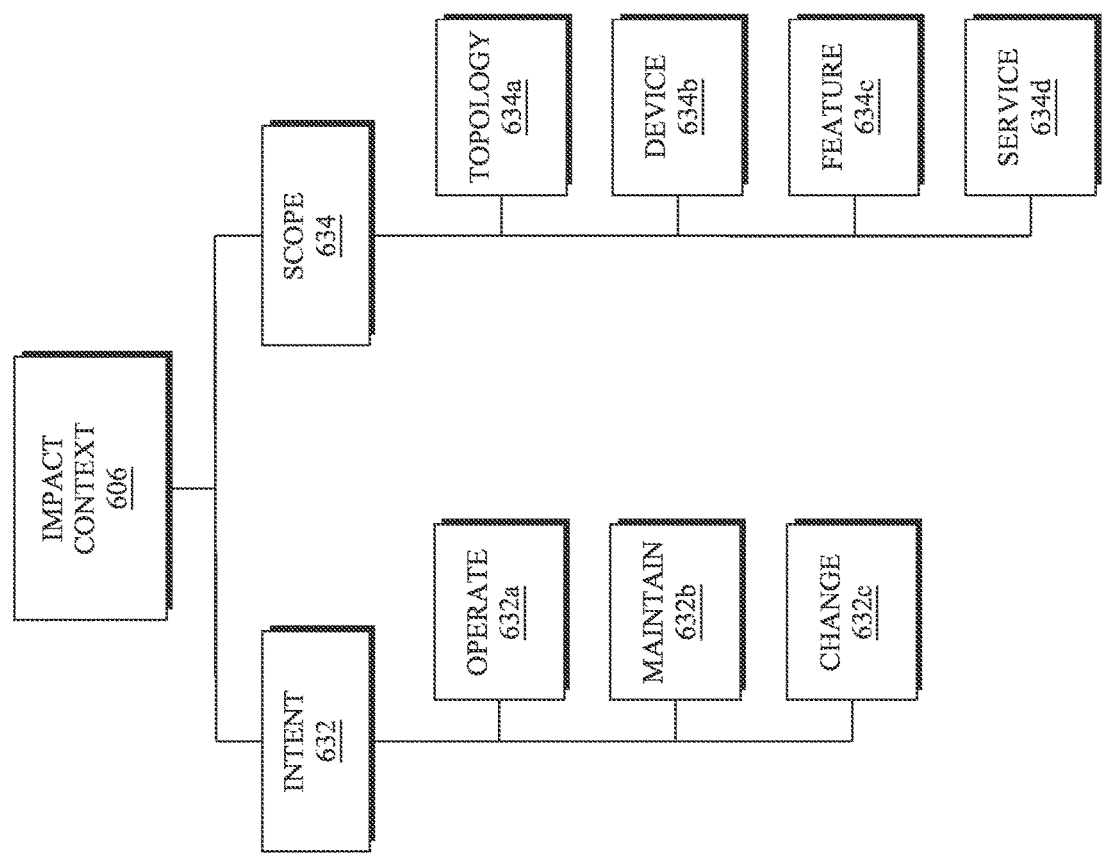

FIGS. 6A-6C illustrate example concept space information for prioritizing network monitoring alerts, according to various embodiments. In the particular context of the teachings herein, as shown in FIG. 6A, the concept 602 of "Alert Ranking" may comprise two primary sub-concepts: impact reference sub-concept 604 and impact context sub-concept 606.

As shown in FIG. 6B, impact reference sub-concept 604 may be represented by three domains: temporal domain 612, location domain 614, and nature domain 616. As would be appreciated, each domain in a concept space has regions in its quality dimensions, each region constituting the properties of each object in the different domains. For example, temporal domain 612 may comprise a type quality dimension 618 and an escalation quality dimension 620. Similarly, location domain 614 may comprise an entity quality dimension 622 and a scope quality dimension 624. Finally, nature domain 616 may comprise a type quality dimension 626 and a scalable dimension 628.

Each quality dimension may also include any number of attributes, which present other features of objects in a metric subspace based on their measured quality values. For example, type quality dimension 618 may comprise quality values 618a-618c indicative of whether the network was impacted by a given anomaly, is impacted now, or will be impacted, respectively. Escalation quality dimension 620 may comprise quality values 620a-620b indicative of whether the anomaly is stable or variable, respectively. Entity quality dimension 622 may comprise quality values 622a-622c indicative of whether the anomaly relates to the network, a particular device or service, or other component, respectively. Scope quality dimension 624 may comprise quality values 624a-624c indicative of whether the affected location is stable, variable, or moving, respectively. Type quality dimension 626 of nature domain 616 may include quality values 626a-626c indicative of whether the anomaly relates to network performance, scaling, or security, respectively. Finally, scalable quality dimension 628 of nature domain 616 may include quality values 628a-628c indicative of whether the anomaly is minor, major, or total/network wide, respectively.

Generally, impact reference sub-concept 604 allows the network monitoring system to infer the impact of an anomaly alert by mapping the origins of the alert to the impacted layers. Impact inference allows discovering that a downstream alert reviewer has a particular interest in some components such as IGP health, a group of specific device/ core, specific types of traffic multicast video, etc. This allows the alert prioritization mechanism to bring in inferences about new issues to the attention of users, even if the impact of the alerts is not fully qualified. At the same time, the system is adequate even when the models used are not ideal, since the system continuously improves itself, as detailed below.

Once which, and how, layers are impacted/identified to the best of the available knowledge, inferences are passed for impact context assessment. Here, the objective is to review and verify the impact versus the solution being monitored. For example, if an interface on a core device went down, it would be an interest-worthy event, in most situations. However, the core (and network/solution) would generally have redundancy so the impact of the failure would not be as significant if the redundancy did not exit. While it is important to follow up the inferential process, it is not necessarily the most critical priority, unless it is the last interface in the core, as in this case the change from degraded to down that is relevant.

As shown in FIG. 6C, impact context sub-concept 606 may comprise two domains: an intent domain 632 and a scope domain 634. For example, intent domain 632 may include sub-domains 632a-632c representing the intent to operate, maintain, or change the network in some way, respectively, as a result of the detected anomaly. Similarly, scope domain 634 may comprise sub-domains 634a-634d representing the various possible scopes for the anomaly: topology, device, feature, or service, respectively.

Referring again to FIG. 5, the conceptual space allows for the discovery of regions that are naturally linked to abstract symbols used in symbolic layer 506, to discover the correlations shared by the different conceptual domains and the complex interactions among the corresponding user groups, i.e., end users, network operators, content providers. The overall model is bi-directional as it is planned for predictions and action prescriptions depending on the data causing the activation in sub-symbolic layer 502.

Layer hierarchy 500 shown is particularly appealing when matched with the attention mechanism provided by a cognitive system that operates under the assumption of limited resources and time-constraints. For practical applications, the reasoning logic in symbolic layer 506 may be non-axiomatic and constructed around the notion of insufficient knowledge and resources. It may be implemented, for example, with a Non-Axiomatic Reasoning System (open-NARS) 510. However, other reasoning engines can be used, such as Auto-catalytic Endogenous Reflective Architecture (AERA), can also be used in symbolic layer 506, in further embodiments. In turn, a ranked alert 514 coming from symbolic layer 506 may be provided to a user interface (UI) for review, based on its ranking/prioritization.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoners generally differ from more traditional axiomatic reasoners in that the former applies a truth value to each statement, based on the amount of evidence available and observations retrieved, while the latter relies on axioms that are treated as a baseline of truth from which inferences and conclusions can be made.

Figure 7:
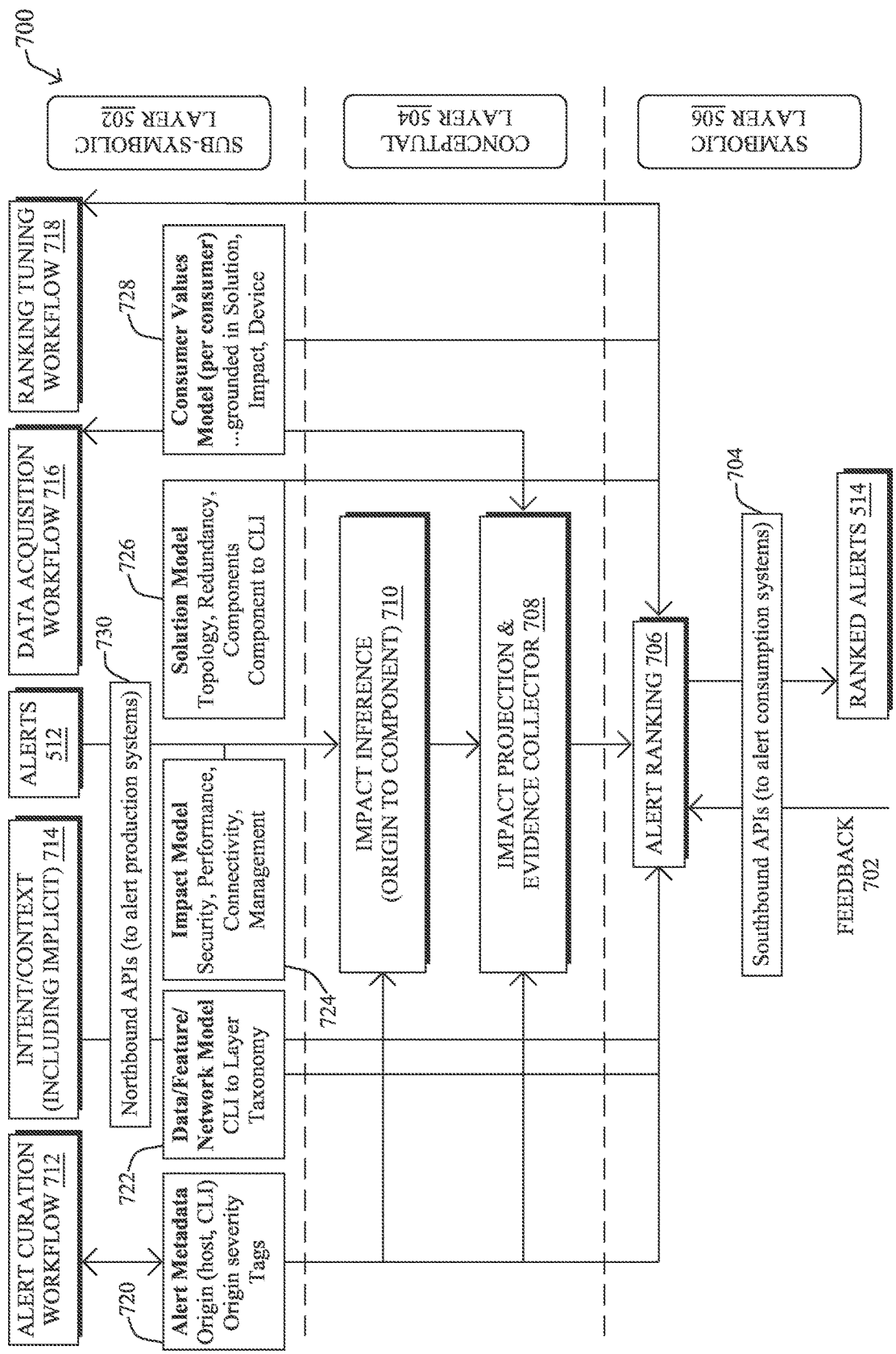
FIG. 7 illustrates an example deep fusion reasoning engine (DFRE) architecture for prioritizing network monitoring alerts.

FIG. 7 illustrates an example DFRE architecture 700, which may also close the loop between the symbolic and sub-symbolic layers 506, 502, respectively, according to various embodiments. For example, DFRE architecture 700 can be used to implement DFRE 406 described previously, for purposes of prioritizing alerts in a network monitoring system. As would be appreciated, the overall concept of a DFRE, is a cognitive automation solution that combines machine learning and/or deep learning, conceptual spaces, and symbolic reasoning, to meet the various needs of intelligent automation for a network.

In the simplified case of layer hierarchy 500 shown in FIG. 5, the sub-symbolic processors, i.e., the machine learning/deep learning components that process multi-modal data, may be manually defined at design time or system implementation time. Thus, if the system encounters new types of objects, behaviors, temporal patterns, X→Y mappings of any kind at runtime, then the only mechanism available to add these needed sub-symbolic capabilities to the system is further manual intervention such as training new deep learning models to handle the newly required X→Y mappings. Architecture 600 introduces an evolution of this concept that also provides a closed loop system for the automatic detection and generation of new needed sub-symbolic processing subsystems.

The DFRE-based alert prioritization mechanism introduced herein operates on four basic assumptions:
1. Network devices are sufficiently well instrumented and the network monitoring system (upstream of the DFRE) is able to directly monitor the most essential layers and components of the network. This allows an issue at a certain layer to be detected at the same layer where it was probed. An operator can trade-off false positives and/or spurious correlations versus prediction horizon by ignoring the predictions where cause-and-effect have high degree of separation.
2. Network Devices are relatively stable in their design. Hence, they do not require constant re-modelling of their functionalities.
3. The impact of a detected anomaly on affected systems can be expressed by relatively compact and stable functional decompositions.
4. Alerts can be enriched with extra metadata, when available, allowing a more granular and precise ranking and distribution.

As shown, DFRE architecture 700 may receive alerts 512, such as alerts raised by an anomaly detector of the network monitoring service. Such alerts 512 may indicate, for example, anomalies in the collected telemetry data from the network, diagnostic outputs or patterns matching device metadata vs. rules or models (e.g., software versions that match a known bug), or the like. In turn, DFRE architecture 700 may assess alerts 512 and use the mechanisms shown, to send alerts 514 to one or more user interfaces for review, based on their rankings. For example, DFRE architecture 700 may leverage southbound application programming interfaces (APIs) to send alerts 514 to the UI(s) for review and may leverage northbound APIs 730 to alert production systems as to the detected anomalies from alerts 512.

According to various embodiments, DFRE architecture 700 may implement a number of workflows, to infer the impact of a raised alert 512, as well as its context, to rank/prioritize the alerts. These workflows may be performed at sub-symbolic layer 502 and may include any or all of the following:

Alert curation workflow 712—This workflow collects metadata 720 regarding the raised alerts 512 and annotates the alerts with the metadata according to models 722-728, described below. For example, metadata 720 may indicate the origin of the alert 512, such as the host, command line interface (CLI), etc., the severity associated with the origin, tags, or the like. Indeed, every alert 514 may have associated information such as device type, family (e.g., router, switch, firewall, compute server, etc.), software type, version, IP address, network identifier and customer identifier, time information. Additional information from upstream alert generation system may also be included in metadata 720, such as an alert pre-classification or base rate. This information is used for impact inference.

Intent/Context Workflow 714—This workflow may leverage northbound APIs 730 to evaluate additional information from the network, to determine the relevance of alerts 512 to the reviewer. For example, this workflow may capture information such as the device host name, type of router, switch, firewall, OS type, OS version, to configure a feature, etc. This workflow can also capture implicit intents, as well, such as the intent of the reviewer to operate a device or network capability.

Data Acquisition Workflow 716—This workflow can be used to collect data for resolving ambiguities and validating inferences. Specifically, this workflow may collect command output data, sample telemetry, etc. from the probed device and/or other devices nearby. For example, a routing protocol status can be collected in order to verify that only a specific protocol is affected, or failures exist at lower layers in the network, indicating that many other protocols are affected.

Ranking Tuning Workflow 718—This workflow operates to incorporate feedback 702 from the alert reviewer(s) regarding alerts 514, in order to improve the alert rankings. This workflow could, for example, make models 722-728 more specific and detailed, based on feedback 702 indicating whether the reviewer considered an alert 514 to be relevant or not.

To support the various workflows 712-718, sub-symbolic layer 502 may include any or all of the following models:

Device/Feature/Network Model(s) 722—This model may comprise a model of the various Open System Interconnection (OSI) layers of the network. This model may also model the various device components associated with an alert 512 such as CPU usage, memory usage, storage space, interrupts, OS, hardware, etc. Model 722 may further include a feature model that links high level protocol information together such as, but not limited to, Address Resolution Protocol (ARP), Internet Control Message Protocol (ICMP), IP, TCP, UDP, Open Shortest Path First (OSPF), Enhanced Interior Gateway Routing Protocol (EIGRP), Border Gateway Protocol (BGP), and others. This information is used for impact projection.

Impact Model(s) 724—This model represents simple relationships between alerts 512 by iteratively tagging alerts 512 with additional information (e.g., tags) regarding their relationships. For example, impact model 724 may tag an alert 512 with a tag such as "is-like" or "is-not-like," allowing the system to include or disregard characteristics of other alerts 512 and enable DFRE architecture 700 to develop more robust impact models. Such tagging may also tag alerts 514 by their categorization, such as security, network performance, network connectivity, network management, or the like.

Solution Model(s) 726—The role of a solution model is to gather information like topology and 'evidence of being alive' for each component. For example, in the case of a core interface going down, a service operator may check if the control plane (say a number of entries in 'show ip cef summary') on core devices (listed in solution model) is above a threshold, implying the core still has connectivity to the rest of the network. This empiric approach enables the capability to reduce noise coming from a number of events leading to 'small failures clutter' present in complex systems, without fully codifying every single aspect of the network/device/solution, which is a prohibitive task from a knowledge engineering standpoint.

Consumer values model 728—The interests of end users/alert reviewers of the system are captured in this model. Different groups within an organization may have interest in different types of alerts. In addition, their interests maybe dependent on the origin of an alert 512, such as alerts for specific subset of devices, specified by role, importance, device type, network location, etc. Finally, the interest maybe be temporal in nature. For example, an alert reviewer may ignore alerts from certain devices while maintenance is being carried out on the said devices and model 728 may capture this for the future ranking of alerts so that alerts tied to maintenance in the network can be suppressed. This model is also used with impact projection.

Generally, models 720-728 provide a formation process for a conceptual space framework (e.g., conceptual layer 504) to discover meaningful concepts in an unsupervised way from the multimodal sensory input representations. Typically, models 720-728 may take the form of DNNs that learns a dense (compressed) representation of multiple sensory inputs. However, in other embodiments, they may also take the form Hierarchical Temporal Memory (HTM) models or any other unsupervised learning framework that learns a sparse distributed representation of the multiple sensory inputs.

As noted, DFRE architecture 700 leverages the framework of conceptual spaces in conceptual layer 504 to bridge the gap between sub-symbolic layer 502 and symbolic layer 506, which is based on geometric representations. As would be appreciated, a conceptual space is a similarity space spanned by a number of quality dimensions that are based on perception and/or sub-symbolic processing. Convex regions in this space correspond to concepts formation. Abstract symbols can thus be grounded into reality by linking them to regions in the conceptual space. For example, conceptual layer 504 may be implemented according to FIGS. 6A-6C, described previously, to perform an impact inference 710 and impact projection 708 (with evidence collection), using sub-concepts 604-606, respectively. This allows for alert ranking 706 to be performed by a semantic reasoner at symbolic layer 506, for purposes of ranking alerts 512 according to their perceived value/relevance to the reviewer. In other words, DFRE architecture 700 actively collects empiric evidence (i.e., observations that can be structured, unstructured, time series, etc.) of any impacted component in the network still being alive and infer the rank of the alert when different conditions are met.

Said differently, alert ranking 706 at symbolic layer 506 factors user-preferences and external intent/context into the alert ranking process. Since there are often multiple alert reviewer/consumer groups within a company, each with its own sphere of interests, the system supports multiple models per consumer. In some cases, the interests of the different groups (e.g., security, network ops, etc.) can be templatized, even without upfront feedback 702 regarding the interests of the individual users. This allows a network monitoring service that supports usual server, application, and network operations classification, can make mixed decisions based on crossing commonalities among user-interests, impacted layers, speculative interest level, and the like.

A typical application scenario for DFRE architecture 700 is as follows: the system is placed between upstream systems (e.g., those generating alerts, anomalies, etc.), and downstream systems that permit end users (e.g., network operations, engineering staff, security officers, maintenance workers, design teams, solution teams), in order to measure the relevance of a given alert/anomaly for a specific user-profile, and optionally some additional context (e.g. whether team executes a planned change).

Thus, DFRE architecture 700 provides a way to bridge specific findings for alert detection systems with abstract, incomplete and conflicting specifications of what constitutes relevant for specific user-profile and a given context. The system operates on alert information and metadata, along with information about user-profile and various domain-models, via the sub-symbolic to symbolic processing and through extensive reasoning in the symbolic domain, which includes generation and testing of hypothesis, active diagnostic testing, reasoning for discovering new probable causal relationships among alert properties and user profiles.

Figure 8:
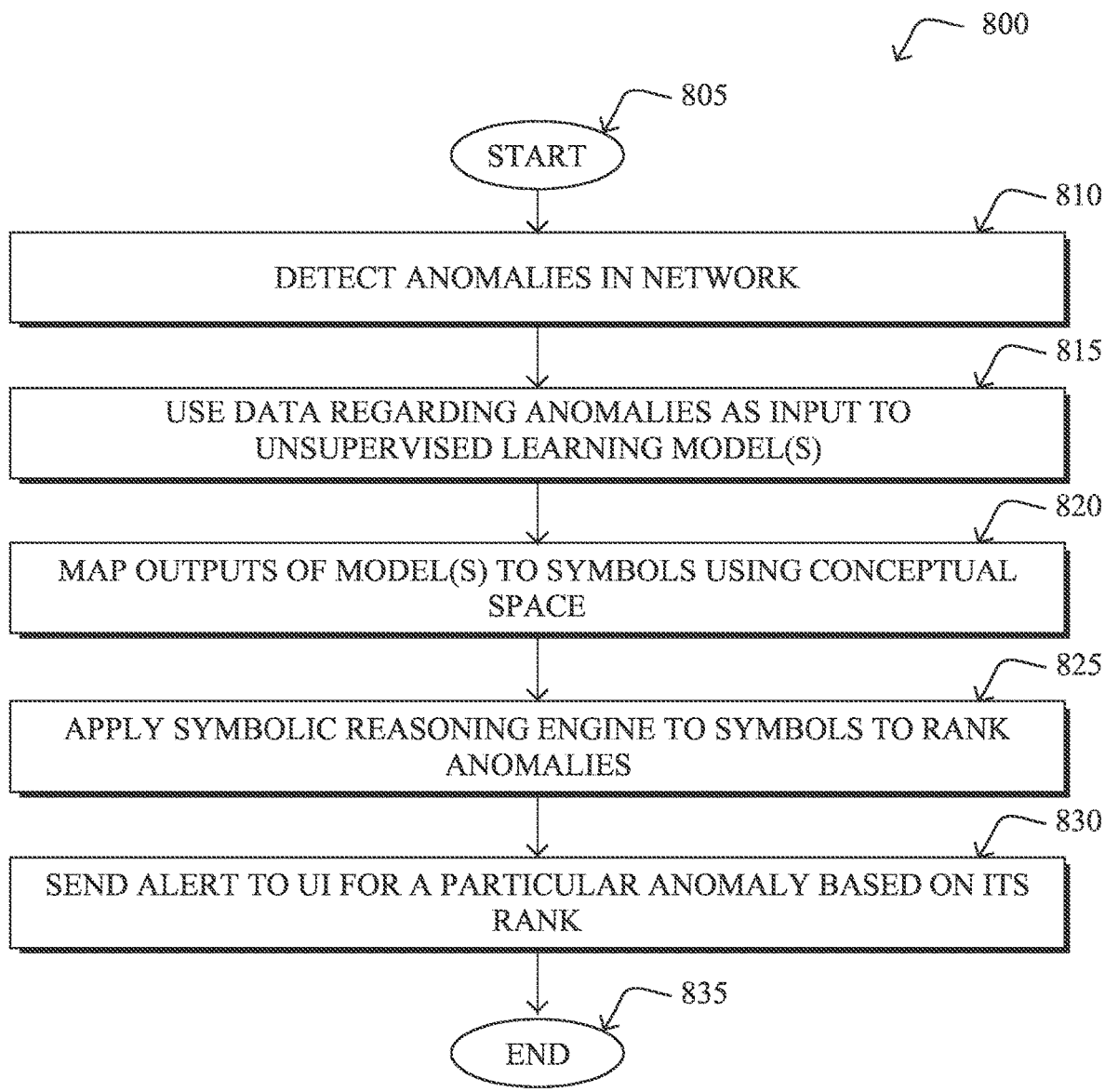
FIG. 8 illustrates an example simplified procedure for prioritizing network alerts using a DFRE.

FIG. 8 illustrates an example simplified procedure for prioritizing network alerts using a DFRE, in accordance with one or more embodiments described herein. For example, a non-generic, specifically configured device (e.g., device 200) may perform procedure 800 by executing stored instructions (e.g., process 248), to provide a network monitoring service to a network. The procedure 800 may start at step 805, and continues to step 810, where, as described in greater detail above, the network monitoring service may detect a plurality of anomalies in the network. For example, the service may use telemetry data from the network as input to one or more machine learning-based anomaly detectors, to detect the anomalies. In other cases, the service may compare the telemetry data to a predefined set of rules or heuristics, to detect the anomalies. By way of example, assume that the average number of clients attached to a wireless access point is five, but suddenly jumps to twenty-five. In such a case, the service may flag this as anomalous. In further embodiments, the service may also identify anomalies/alerts regarding a diagnostic output or matched pattern in the network, such as when a configuration of a device matches that of a known bug or exploit.

At step 815, as detailed above, the service may use data regarding the detected anomalies as input to one or more machine learning models. Such models may include a deep learning model or HTM model for unsupervised learning, in various embodiments, configured to perform a mapping between the multimodal data regarding the detected anomalies (e.g., temporal, location, nature, etc.) and a conceptual space.

At step 820, the service may map, using a conceptual space, outputs of the one or more machine learning models to symbols. Such a conceptual space may, for example, comprise an impact reference sub-concept and/or an impact context sub-concept. The impact reference sub-concept may model one or more of: temporal characteristics of a detected anomaly, a location of a detected anomaly in the network, or a nature of a detected anomaly in the network, such as to infer the actual impact of the detected anomaly or other alert on the network. For example, a raised anomaly may be quite localized in the network and not have much of an actual effect on the operation of the network. Conversely, the impact context sub-concept may model one or more of: an intent associated with a detected anomaly or a scope of a detected anomaly. For example, maintenance performed on a specific device, feature, etc. in the network may result in a raised anomaly that may be of little interest to the reviewer.

At step 825, as detailed above, the service may apply a symbolic reasoning engine to the symbols, to rank the anomalies. In general, DFRE is a cognitive system built under the Assumption of Insufficient Knowledge and Resources (AIKR). The reasoning engine may be non-axiomatic, in some cases, such as open-NARS-based or the like. In other embodiments, the engine may be AERA-based. Generally, the function of the symbolic reasoner is to assess the symbols from the conceptual layer and assign a priority/rank to the raised anomaly or other alert. For example, say the symbols from the conceptual layer lie along the dimensions indicating that the anomaly was localized to a specific device, is stable and not growing in scope, affects performance of the device, is minor in nature, etc. In such a case, the reasoning engine may assign a low rank/priority score to the anomaly.

At step 830, the service may send an alert for a particular one of the detected anomalies to a user interface, based on its corresponding rank. For example, if the anomaly is related to the user's area of expertise (e.g., security), affects a large portion of the network, etc., the service may assign a higher rank to the anomaly and send an alert to the UI of that user for review. Conversely, if the anomaly is minor in nature, outside of the user's area of expertise, etc., the service may suppress sending an alert to the UI of the user, so as not to overwhelm the user with alerts of little relevance. In further embodiments, the service may also receive feedback from the UI regarding his or her perceived relevance of the alert and use the feedback to update one of the machine learning models or reasoning system knowledge representation using the feedback. For example, such a model may predict which of the data regarding the detected anomalies is of interest to a user of the user interface. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, a DFRE-based architecture is introduced that addresses the problem of 'alert storming' in which a network monitoring system raises a large number of alerts that may be of little interest or relevance to the alert reviewer(s). In some aspects, the techniques herein also have the ability to detect the need for new sub-symbolic processing, as well as delete, modify, and add new sub-symbolic processing in an automated fashion.

While there have been shown and described illustrative embodiments that provide for prioritizing alerts in a network monitoring system, it is to be understood that various other adaptations and modifications may be made within the spirit and scope of the embodiments herein. For example, while certain embodiments are described herein with respect to using certain models for purposes of assessing the operation of a wireless network, the models are not limited as such and may be used for other functions, such as assessing hardwired networks, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by a service that monitors a network, a plurality of anomalies in the network;
   using, by the service, data regarding the detected anomalies as input to one or more machine learning models;
   mapping, by the service, outputs of the one or more machine learning models to symbols using a conceptual space that is a geometrical structure defined by a set of quality dimensions;
   ranking, by the service, the detected anomalies by applying a symbolic reasoning engine to the symbols; and
   sending, by the service, an alert for a particular one of the detected anomalies to a user interface based on a ranking corresponding to the particular detected anomaly.

2. The method as in claim 1, wherein detecting the plurality of anomalies in the network comprises:
   using telemetry data from the network as input to one or more machine learning-based anomaly detectors.

3. The method as in claim 1, wherein the one or more machine learning models comprise a deep learning model or hierarchical temporal memory (HTM) model.

4. The method as in claim 1, further comprising:
   receiving, at the service, feedback from the user interface regarding relevance of the alert; and
   updating one of the one or more machine learning models using the feedback, wherein the updated machine learning model predicts which of the data regarding the detected anomalies is of interest to a user of the user interface.

5. The method as in claim 1, wherein the conceptual space further comprises a plurality of concepts and a plurality of quality values assigned to quality dimensions in the set of quality dimensions, each of the plurality of quality values corresponding to a property of a particular one of the plurality of concepts.

6. The method as in claim 1, wherein, upon the mapping of the outputs of the one or more machine learning models to the symbols using the conceptual space, each of the symbols is linked to a quality dimension in the set of quality dimensions.

7. The method as in claim 6, wherein the ranking of the detected anomalies by applying the symbolic reasoning engine to the symbols comprises:
   assessing, by the service, the symbols based on the quality dimension to which each of the symbols is respectively linked.

8. The method as in claim 1, wherein the symbolic reasoning engine is non-axiomatic.

9. The method as in claim 1, wherein the one or more machine learning models comprise one or more of: a device, feature, or network model, an impact model, or a solution model.

10. An apparatus, comprising:
    one or more network interfaces to communicate with a network;
    a processor coupled to the one or more network interfaces and configured to execute one or more processes; and
    a memory configured to store a process executable by the processor, the process when executed configured to:
      detect a plurality of anomalies in the network;
      use data regarding the detected anomalies as input to one or more machine learning models;
      map outputs of the one or more machine learning models to symbols using a conceptual space that is a geometrical structure defined by a set of quality dimensions;
      rank the detected anomalies by applying a symbolic reasoning engine to the symbols; and
      send an alert for a particular one of the detected anomalies to a user interface based on a ranking corresponding to the particular detected anomaly.

11. The apparatus as in claim 10, wherein the apparatus detects the plurality of anomalies in the network by:
    using telemetry data from the network as input to one or more machine learning-based anomaly detectors.

12. The apparatus as in claim 10, wherein the one or more machine learning models comprise a deep learning model or hierarchical temporal memory (HTM) model.

13. The apparatus as in claim 10, wherein the process when executed is further configured to:

receive feedback from the user interface regarding relevance of the alert; and update one of the one or more machine learning models or a reasoning system knowledge representation using the feedback, wherein the updated machine learning model predicts which of the data regarding the detected anomalies is of interest to a user of the user interface.

14. The apparatus as in claim 10, wherein the conceptual space further comprises a plurality of concepts and a plurality of quality values assigned to quality dimensions in the set of quality dimensions, each of the plurality of quality values corresponding to a property of a particular one of the plurality of concepts.

15. The apparatus as in claim 10, wherein, upon the mapping of the outputs of the one or more machine learning models to the symbols using the conceptual space, each of the symbols is linked to a quality dimension in the set of quality dimensions.

16. The apparatus as in claim 15, wherein the apparatus applies the symbolic reasoning engine to the symbols by:

assessing the symbols based on the quality dimension to which each of the symbols is respectively linked.

17. The apparatus as in claim 10, wherein the symbolic reasoning engine is non-axiomatic.

18. The apparatus as in claim 10, wherein the process when executed is further configured to:

rank an alert regarding a diagnostic output or matched pattern in the network.

19. A tangible, non-transitory, computer-readable medium storing program instructions that cause a service that monitors a network to execute a process comprising:

detecting, by the service that monitors the network, a plurality of anomalies in the network;

using, by the service, data regarding the detected anomalies as input to one or more machine learning models;

mapping, by the service, outputs of the one or more machine learning models to symbols using a conceptual space that is a geometrical structure defined by a set of quality dimensions;

ranking, by the service, the detected anomalies by applying a symbolic reasoning engine to the symbols; and sending, by the service, an alert for a particular one of the detected anomalies to a user interface based on a ranking corresponding to the particular detected anomaly.

20. The computer-readable medium as in claim 19, wherein the conceptual space further comprises a plurality of concepts and a plurality of quality values assigned to quality dimensions in the set of quality dimensions, each of the plurality of quality values corresponding to a property of a particular one of the plurality of concepts.

\* \* \* \* \*